(12) United States Patent
Sano et al.

(10) Patent No.: US 6,821,330 B1
(45) Date of Patent: Nov. 23, 2004

(54) INK COMPOSITION AND METHOD OF RECORDING A RECORDING MEDIUM USING THIS

(75) Inventors: Tsuyoshi Sano, Nagano (JP); Masaaki Itano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/664,416

(22) Filed: Sep. 17, 2003

Related U.S. Application Data

(63) Continuation of application No. 09/779,380, filed on Feb. 8, 2001, now abandoned.

(30) Foreign Application Priority Data

| Feb. 8, 2000 | (JP) | 2000-30309 |
| Jun. 20, 2000 | (JP) | 2000-185135 |
| Aug. 18, 2000 | (JP) | 2000-248917 |
| Feb. 6, 2001 | (JP) | 2001-29431 |

(51) Int. Cl.[7] ............................................. C09D 11/00
(52) U.S. Cl. .................. 106/31.58; 106/31.49; 106/31.86; 106/31.89; 106/31.78; 106/31.59
(58) Field of Search .................... 106/31.58, 31.86, 106/31.49, 31.59, 31.89, 31.78

(56) References Cited

U.S. PATENT DOCUMENTS

| 5,560,770 A | 10/1996 | Yatake |
| 5,616,174 A | 4/1997 | Kanaya et al. |
| 5,830,264 A | 11/1998 | Fujioka et al. |

(List continued on next page.)

FOREIGN PATENT DOCUMENTS

| EP | 0 651 037 | 5/1995 |
| EP | 0 838 508 | 4/1998 |
| EP | 0 872 344 | 10/1998 |
| EP | 0 959 111 | 11/1999 |
| JP | 57107848 | 7/1982 |
| JP | 05059314 | 3/1993 |
| JP | 6106735 | 4/1994 |
| JP | 6107971 | 4/1994 |
| JP | 7125220 | 5/1995 |
| JP | 7-125220 | 5/1995 |
| JP | 8-113739 | 5/1996 |
| JP | 8-283631 | 10/1996 |
| JP | 10-120950 | 5/1998 |
| JP | 10-28737 | 10/1998 |
| JP | 11-12508 | 1/1999 |
| JP | 11-228898 | 8/1999 |
| JP | 2000-290559 | 10/2000 |

OTHER PUBLICATIONS

Patent Abstracts of Japan of JP 2000–290559 (10/2000) and Computer Generated English Translation.
Patent Abstracts of Japan Publication No. 571078848 A Dated Jul. 5, 1982.
Patent Abstracts of Japan Publication No. 05059314 A Dated Mar. 9, 1993.
Patent Abstracts of Japan Publications No. 06107971 A Dated Apr. 19, 1994.
Patent Abstracts of Japan Publication No. 06106735 A Dated Apr. 19, 1994.

(List continued on next page.)

Primary Examiner—Mark L. Bell
Assistant Examiner—Veronica F. Faison
(74) Attorney, Agent, or Firm—Ladas & Parry

(57) ABSTRACT

This consists in an ink composition containing: a coloring agent, 2-pyrrolidone, a specific surfactant, a butyl ether-based solvent, water, and a water-soluble organic solvent. With the present invention, it is possible to provide an ink composition with which clogging cannot occur, which is of excellent discharge stability, and which affords excellent printing quality by preventing blurring.

26 Claims, 2 Drawing Sheets

U.S. PATENT DOCUMENTS

| | | |
|---|---|---|
| 5,935,309 A | 8/1999 | Moffatt et al. |
| 5,948,154 A | 9/1999 | Hayashi et al. |
| 5,968,244 A | 10/1999 | Ueda et al. |
| 5,985,015 A | 11/1999 | Kanaya |
| 6,004,389 A | 12/1999 | Yatake |
| 6,030,441 A | 2/2000 | Kubota et al. |
| 6,080,229 A | 6/2000 | Watanabe et al. |
| 6,132,502 A | 10/2000 | Yatake |
| 6,153,001 A | 11/2000 | Suzuki et al. |
| 6,277,184 B1 | 8/2001 | Kato |
| 6,284,029 B1 | 9/2001 | Sano et al. |
| 6,419,733 B1 | 7/2002 | Sano et al. |
| 6,432,186 B1 | 8/2002 | Taniguchi |
| 6,436,179 B1 | 8/2002 | Hiraoka et al. |
| 6,440,203 B2 | 8/2002 | Kato |
| 6,447,592 B1 | 9/2002 | Taniguchi |
| 6,454,844 B1 | 9/2002 | Kanaya |
| 6,454,845 B1 | 9/2002 | Shawcross et al. |
| 2002/0002930 A1 | 1/2002 | Yamashita et al. |

OTHER PUBLICATIONS

Patent Abstracts of Japan Publication No. 07125220 A Dated May 16, 1995.

English Translation of JP 8–113739 Dated May 7, 1996.

English Translation of JP 8–283631 Dated Oct. 29, 1996.

English Translation of JP 11–12508 Dated Jan. 19, 1999.

English Translation of JP 10–120950 Dated May 12, 1998.

English Translation of JP 7–125220 Dated May 16, 1995.

English Translation of JP 10–287837 Dated Oct. 27, 1998.

English Translation of JP 11–228898 Dated Aug. 24, 1999.

INK COMPOSITION AND METHOD OF RECORDING A RECORDING MEDIUM USING THIS

This application is a continuation of application Ser. No. 09/779,380 filed on Feb. 8, 2001 now abandoned, claims the benefit thereof and incorporates the same by reference.

BACKGROUND OF THE INVENTION

1. Field of the Invention

The present invention relates to an ink composition used chiefly for printing by an inkjet system; in more detail, it relates to an ink composition of high printing quality and a method of recording a recording medium using this of excellent ink discharge stability and wherein clogging cannot occur, thereby preventing blurring.

2. Description of the Related Art

The inkjet recording method is a method of printing in which printing is performed by creating flying droplets of an ink composition, and depositing these on a recording medium such as paper. This method has the characteristic that it is capable of performing high-speed printing of a high-resolution, high-quality image with a comparatively inexpensive device. The ink compositions that are used in ordinary inkjet recording have water as their main constituent and contain therein coloring constituents and wetting agents such as glycerin with the object of preventing clogging.

However, with the previously proposed ink compositions, there was the problem that, when the ink permeated into the recording medium, blurring was sometimes produced, resulting in lowered printing quality. Blending with various types of surfactant was therefore proposed as a technique for producing an excellent image with no blurring, by accelerating or suppressing permeation of the ink composition into the recording medium.

For example, as prior art in which the use of an acid ester-based surfactant as surfactant is proposed, in Laid-open Japanese Patent Publication No. H. 5-59314, there is proposed an ink composition of short drying time obtained by combination of an aqueous liquid vehicle, coloring material, and phosphoric acid ester. Also, Laid-open Japanese Patent Publication No. H. 6-107971 proposes an aqueous pigment ink that does not produce liquid accumulations in the vicinity of the jets and that satisfies printing quality, by means of a recording liquid containing: a water-soluble solution, pigment, water-soluble resin, water and phosphoric acid ester-based surfactant or fluorine-containing surfactant; or boron-containing surfactant or polyoxyethylene alkyl ether or polyoxyethylene phenyl ether-based surfactant.

Furthermore, it has been proposed (Laid-open Japanese Patent Publication No. H. 6-106735) to obtain a high quality color image of high image density and no color blurring by employing in combination at least a color ink containing a surfactant or permeable solvent that confer permeability and a salt, and a black ink that thickens or coagulates due to the action of this salt. Specifically, an inkjet recording method is proposed whereby an excellent image is stated to be obtained by printing using the two liquids: a first liquid containing salt, and an ink composition.

Also, with an ink composition for inkjet recording, in addition to the property of producing excellent images with no blurring on the recording medium, it is required that discharge from the nozzle of the inkjet recording head should be achieved reliably and without deviating from the prescribed flight direction. If the ink fails to discharge or ink droplets are discharged deviating from the prescribed flight direction (hereinbelow, such deviation of ink droplets from the prescribed flight direction may be termed bending of the flight path of the ink droplets), this causes "missing dots" or lowering of sharpness of the image etc. Various proposals have been made involving adjusting the type and amount of additives of the ink composition in order to prevent such poor ink discharge and/or bending of the flight path. Several proposals have also been made for constructions of the inkjet recording head such as to reduce bending of the flight path. Regarding the latter, it has been proposed to attempt to ensure reliable discharge of ink droplets with no flight path bending for example by conferring on the nozzle plate the property of being resistant to wetting by the ink (ink repellence). For example, in Laid-open Japanese Patent Publication No. Sho. 57-107848, it is proposed to suppress leakage of ink around the nozzle by uniformly forming an ink repellent coating of for example fluorine resin on the inside surface of the nozzle and outside surface of the nozzle plate by sputtering. Furthermore, in Laid-open Japanese Patent Publication No. H. 7-125220, it is proposed to provide an ink repellent coating as far as the inside surface of the nozzle in a prescribed amount related to the amount of ink in the ink drop.

However, if, as in the prior art described above, a large quantity of surfactant is introduced into the ink composition, the solution stability of the ink composition is lowered, so a solid fraction clogs the ink discharging portions of the printer, resulting in the problems of poor stability of discharge and a tendency to clogging.

SUMMARY OF THE INVENTION

An object of the present invention is therefore to provide an ink composition with which there is no possibility of clogging, which is of excellent discharge stability, with which blurring is prevented, and whereby excellent images can be achieved.

A further object of the present invention is to provide a method of recording whereby a recording can be formed with which there is no possibility of clogging, which is of excellent discharge stability, with which blurring is prevented, and whereby excellent images can be achieved.

Also a further object of the present invention is to provide a recording with which there is no possibility of clogging, which is of excellent discharge stability, with which blurring is prevented, and whereby excellent images can be achieved.

The present inventors obtained the discovery that discharge stability of the ink drops and reliability in respect of clogging can be improved, blurring prevented and excellent printed images provided by including in combination a coloring agent, 2-pyrrolidone, a specific surfactant, a butyl ether-based solvent, water, and a water-soluble organic solvent.

Specifically, according to the present invention, the above objects are achieved by providing an ink composition containing at least a coloring agent, 2-pyrrolidone, a surfactant, a butyl ether-based solvent, water, and a water-soluble organic solvent wherein the surfactant is a chemical compound represented by the following chemical formula (I).

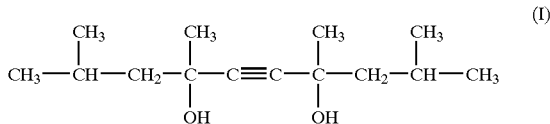

(I)

Also, according to the present invention, there is provided an ink composition wherein the weight ratio of the surfactant, butyl ether-based solvent, and 2-pyrrolidone is 1:4:4 to 1:20:20.

Also, according to the present invention, there is provided an ink composition wherein the butyl ether-based solvent is triethylene glycol monobutyl ether.

Also, according to the present invention, there is provided an ink composition employed in an inkjet recording method using an inkjet recording head comprising a nozzle plate wherein some of the ink repellent coating layer that is coated onto the external surface of the nozzle plate is introduced on to the inner surface of the nozzle such that the volume of the gap within the nozzle from the outer surface of the nozzle plate as far as the meniscus-forming face is in a range of 0.05 to 0.50 with respect to the quantity of ink that is discharged.

Also, according to the present invention, there is provided an ink composition in which the added amount of the coloring agent is 1 to 5 weight % with respect to the ink composition.

Also, according to the present invention, there is provided an ink composition further containing dispersant.

Also, according to the present invention, there is provided an ink composition in which the dispersant is styrene-(meth) acrylic acid based water-soluble resin.

Also, according to the present invention there is provided an ink composition in which the water-soluble organic solvent has a boiling point of at least 180° C.

Also, according to the present invention, there is provided an ink composition further containing as water-soluble organic solvent a tertiary amine.

Also, according to the present invention, there is provided an ink composition further containing alkali hydroxide, alginic acid derivative, or a sugar or sugar derivative.

Also, according to the present invention, there is provided an ink composition wherein the sugar derivative is a reduced sugar, oxidized sugar, sugar dehydration derivative, amino sugar, or thio-sugar.

Also, according to the present invention, there is provided an ink composition wherein the ink repellent coating layer is formed by co-deposition plating.

Also, according to the present invention, there is provided an ink composition as aforesaid further including a compound represented by the following chemical formula (II).

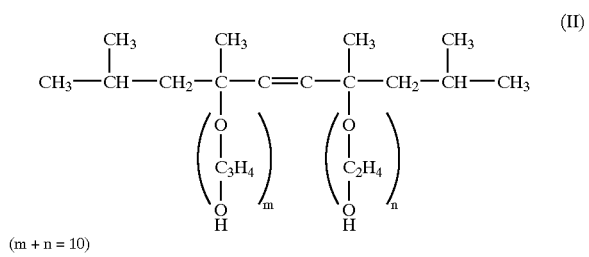

(II)

Also, according to the present invention there is provided an ink composition wherein the content of the chemical compound represented by chemical formula (I) is at least 1 weight % of the total amount.

Also, according to the present invention, there is provided an ink composition wherein the content of the chemical compound represented by chemical formula (I) is 1 to 3 weight %.

Also, according to the present invention there is provided an ink composition wherein the content of the chemical compound represented by chemical formula (II) is at least 1 weight %.

Also, according to the present invention there is provided an ink composition wherein the butyl ether-based solvent is triethylene glycol monobutyl ether or diethylene glycol monobutyl ether.

Also, according to the present invention, there is provided an ink composition wherein the coloring agent is C. I. Pigment Yellow 128.

Also, according to the present invention, there is provided an ink composition wherein the content of the coloring agent is 15 weight % or less in the total amount of the ink composition, the content of the 2-pyrrolidone is at least 2 weight % in the total amount of the ink composition, and the content of the butyl ether-based solvent is at least 4 weight % in the total amount of the ink composition.

Also, according to the present invention, there is provided an ink composition further containing a polymeric dispersant having a carboxyl group in the molecule.

Also, according to the present invention, there is further provided an ink composition containing a moisture retaining agent selected from the group consisting of glycerin, diethylene glycol and ethylene glycol.

Also, according to the present invention there is provided a recording method wherein formation of a recording is performed by depositing the ink composition on the recording medium.

Also, according to the present invention, there is provided a recording method as aforesaid wherein printing is performed by discharging drops of the ink composition and depositing these drops on the recording medium.

Also, according to the present invention, there is provided a recording method as aforesaid employing an inkjet recording head comprising a nozzle plate that has been subjected to ink repellent treatment.

Also, according to the present invention, there is provided a recording method wherein formation of a recording is effected by filling a tank accommodating in its interior a foam comprising a porous member with the ink composition and discharging it from this tank to a recording head.

Also, according to the present invention, there is provided a recording wherein the ink composition is deposited in a prescribed pattern by the recording method.

DESCRIPTION OF THE PREFERRED EMBODIMENTS

Figure 1:
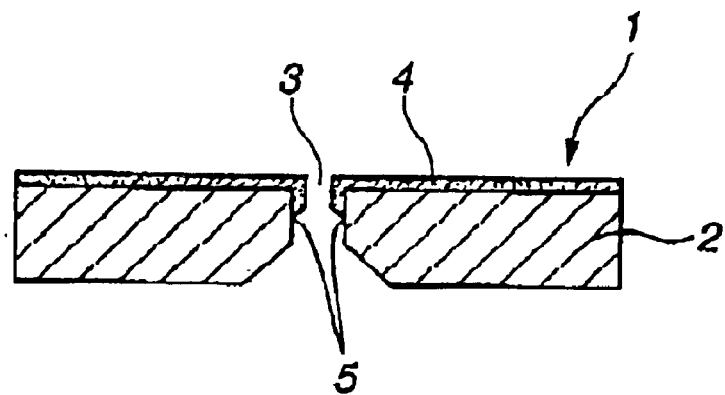
FIG. 1 is a view showing the construction of a nozzle plate of an inkjet recording head wherein an ink composition according to the present invention is employed.

As a result of the fact that an ink composition according to the present invention includes in combination a coloring agent, 2-pyrrolidone, a specific surfactant, a butyl ether-based solvent, water, and a water-soluble organic solvent, it has the advantages that discharge stability of the ink and reliability in respect of clogging can be improved when printing on a recording medium, blurring prevented and excellent printed images obtained.

Surfactant

In the ink composition according to the present invention, a surfactant, in particular, an acetylene glycol-based surfactant is employed. Of acetylene glycol-based surfactants, according to the present invention, a chemical compound represented by the following formula (I) is employed. Of acetylene glycol-based surfactants, this compound has the advantage that, when it is added to the ink composition, the permeability of the ink composition with respect to the recording medium is improved, enabling unevenness of printing to be effectively prevented.

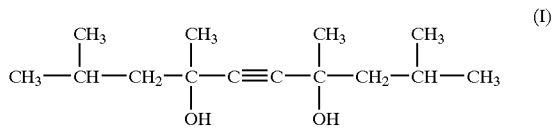

For the surfactant represented by the above formula (II) (hereinbelow referred to as chemical compound (I), commercially available products can be utilized; specifically, Surfynol 104 (available from Air Products and Chemicals Inc.) and Olfine STG (manufactured by Nisshin Kagakusha) may be mentioned as examples.

Also, in addition to the above chemical compound (I), the ink composition of the present invention may include a surfactant represented by formula (II) (hereinbelow referred to as chemical compound (II)).

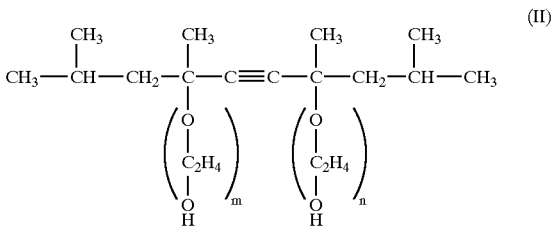

(m + n = 10)

For the compound represented by the above formula (II), commercially available products can be utilized; specifically, Surfynol 465 (available from Air Products and Chemicals Inc.) and Olfine E1010 (Trade name, manufactured by Nisshin Kagakusha) may be mentioned as examples.

By further including as surfactant not just chemical compound (I) but also chemical compound (II), chemical compound (II) has an action of promoting solution of chemical compound (I), so fully sufficient solution of chemical compound (I) in the ink composition can be achieved; consequently, clogging cannot occur and discharge stability is excellent, so that blurring is prevented and excellent printing quality is achieved.

Butyl Ether-based Solvent

Triethylene glycol monobutyl ether and diethylene glycol monobutyl ether etc may be given as examples of butyl ether-based solvents accorded to the invention; these may be employed respectively alone or mixed, when used.

Addition of triethylene glycol monobutyl ether effectively prevents drying of the ink composition at the nozzle front face of the recording head, preventing clogging of the nozzle. The added amount of the triethylene glycol monobutyl ether may be suitably determined in accordance with requirements, but is preferably in the range of about 1 to 20 weight % with respect to the ink composition, and even more preferably a range of about 1 to 10 weight %.

2-Pyrrolidone

An ink composition according to the present invention contains 2-pyrrolidone. Addition of 2-pyrrolidone can effectively prevent printing unevenness and long/short period clogging of the nozzle. The added amount may be suitably determined in accordance with requirements, but is preferably in the range of about 1 to 20 weight % with respect to the ink composition, and even more preferably a range of about 1 to 10 weight %.

In an ink composition according to the present invention, chemical compound (I) may be employed alone as the surfactant; if chemical compound (II) is not employed, the weight ratio of chemical compound (I), the butyl ether-based solvent, and the 2-pyrrolidone is preferably about 1:4:4 to 1:20:20, and even more preferably about 1:4:4 to 1:10:10. In this weight ratio, the added amount of the compound represented by formula (I) is preferably in the range about 0.05 to 5 weight % with respect to the ink composition, and even more preferably in the range about 0.1 to 2.5 weight %. Such an ink composition is more suitable to a method in which recording onto the recording medium is effected with this ink composition being packed in an ink pack.

If, in an ink composition according to the present invention, chemical compound (I) and chemical compound (II) are employed as the surfactant, the content of chemical compound (I) should be at least 1 weight % of the total amount. Preferably, it is between 1 and 3 weight %. If the content of chemical compound (I) is less than 1 weight %, the problem in regard to printing quality of occurrence of color blurring results. If the content of chemical compound (II) is made at least 1 weight % in the total ink composition, this effectively prevents occurrence of blurring and is therefore desirable in order to improve printing quality; even more preferably it is 1 to 3 weight %. If the content of chemical compound (II) is less than 1 weight %, there is a risk of solution stability of the chemical compound (I) becoming difficult to achieve.

Preferably, if compound (I) and compound (II) are employed, the content of the coloring agent is 15 weight % or less in the total amount of the ink composition, the content of the 2-pyrrolidone is at least 2 weight % in the total amount of the ink composition, and the content of the butyl ether-based solvent is at least 4 weight % in the total amount of the ink composition; even more preferably, the content of the coloring agent is 2 to 10 weight % in the total amount of the ink composition, the content of the 2-pyrrolidone is 4 to 6 weight % in the total amount of the ink composition, and the content of the butyl ether-based solvent is 4 to 10 weight % in the total amount of the ink composition. If the content of the coloring agent exceeds 15 weight %, there is a risk of problems occurring in the printing stability and clogging performance. If the content of the 2-pyrrolidone is less than 2 weight % or the content of the butyl ether-based solvent is less than 4 weight %, the chemical compound (I) does not dissolve, and there is a risk of problems concerning the printing stability and clogging performance. Such an ink composition is more suitable to a method in which recording onto the recording medium is effected with this ink composition being packed in an ink cartridge..

Pigment

Pigments and/or dyes can be employed as the coloring agent in an ink composition according to the present invention.

There is no particular restriction on the pigments that may be employed, and both inorganic pigments and organic pigments may be used. As organic pigments, in addition to titanium oxide and iron oxide, carbon black manufactured by known methods such as the contact method, a furnace method or thermal method etc may be employed. Also, as organic pigments, azo dyes (including azo lake, insoluble azo pigments, azo pigment condensates, chelate azo pigments etc), polycyclic pigments (such as for example phthalocyanine pigments, perylene pigments, perinone pigments, anthraquinone pigments, quinacridone pigments, dioxazine pigments, thioindigo pigments, isoindolinone pigments, quinoflarone pigments etc.), dye chelates (for example, basic dye type chelates, acidic dye type chelates etc), nitro pigments, nitroso pigments, or aniline black etc may be employed.

In particular for the carbon black used for black ink, No. 2300, No. 900, MCF88, No. 33, No. 40, No. 45, No. 52, MA7, MA8, MA100, No2200B etc. manufactured by Mitsubishi Kagaku, Raven 5750, Raven 5250, Raven 5000, Raven 3500, Raven 1255, Raven 700 etc manufactured by Columbia Inc., Regal 400R, Regal 330R, Rega 1660R, Mogul L, Monarch 700, Monarch 800, Monarch 880, Monarch 900, Monarch 1000, Monarch 1100, Monarch 1300, and Monarch 1400 etc manufactured by Cabot Inc., Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 etc. manufactured by Degussa Inc. may be employed.

As pigments employed for yellow ink there may be mentioned by way of example C. I. Pigment Yellow 1, C. I. Pigment Yellow 2, C. I. Pigment Yellow 3, C. I. Pigment Yellow 12, C. I. Pigment Yellow 13, C. I. Pigment Yellow 14C, C. I. Pigment Yellow 16, C. I. Pigment Yellow 17, C. I. Pigment Yellow 73, C. I. Pigment Yellow 74, C. I. Pigment Yellow 75, C. I. Pigment Yellow 83, C. I. Pigment Yellow 93, C. I. Pigment Yellow 95, C. I. Pigment Yellow 97, C. I. Pigment Yellow 98, C. I. Pigment Yellow 119, C. I. Pigment Yellow 110, C. I. Pigment Yellow 114, C. I. Pigment Yellow 128, C. I. Pigment Yellow 129, C. I. Pigment Yellow 138, C. I. Pigment Yellow 150, C. I. Pigment Yellow 151, C. I. Pigment Yellow 154, C. I. Pigment Yellow 155, C. I. Pigment Yellow 180, and C. I. Pigment Yellow 185, etc.

As pigments employed for magenta ink there may be mentioned by way of example C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 57:1, C. I. Pigment Red 112, C. I. Pigment Red 122, C. I. Pigment Red 123, C. I. Pigment Red 168, C. I. Pigment Red 184, and C. I. Pigment Red 202 etc.

Further, as pigments employed for cyan ink there may be mentioned by way of example C. I. Pigment Blue 1, C. I. Pigment Blue 2, C. I. Pigment Blue 3, C. I. Pigment Blue 15:3, C. I. Pigment Blue 15:34, C. I. Pigment Blue 15:4, C. I. Pigment Blue 16, C. I. Pigment Blue 22, C. I. Pigment Blue 60, C. I. vat Blue 4, and C. I. Vat Blue 60.

The added amount of the pigment is preferably in the range about 0.5 to 25 weight % with respect to the ink composition, and more preferably in the range 2 to 15 weight %, and even more preferably in the range 1 to 5 weight %. Also, the grain size of the pigment is preferably below 10 µm, and even more preferably below 0.1 µm.

Also, as the aforesaid dyes, there may be mentioned black dyes such as C. I. Direct Black 17, 19, 62, 154; C. I. Hood Black 2, C. I. Reactive Black 5; C. I. Acid Black 52, or C. I. Project Fast Black 2 etc.; yellow dyes such as C. I. Direct Yellow 11, 44, 86, 142, 330; C. I. Acid Yellow 3, 38; C. I. Basic Yellow 11, 51; C. I. Dispersed Yellow 3, 5; and C. I. Reactive Yellow 2; magenta dyes such as C. I. Direct Red 227, 23; C. I. Acid Red 18, 52; C. I. Basic Red 14, 39; and C. I. Dispersed Red 60, and cyan dyes such as C. I. Direct Blue 15, 199, 168; C. I. Acid Blue 9, 40, 74; C. I. Basic Blue 41; and C. I. Reactive Blue 15.

In the present invention, when a pigment is employed as coloring agent, preferably it is added to the ink composition in the form of a pigment dispersion obtained by dispersing in a solvent with a dispersion agent. As preferred dispersion agents, there may be employed known dispersion agents which are used to prepare prior art pigment dispersions, such as for example polymeric dispersion agents or surfactants.

Preferred examples of polymeric dispersion agents include natural polymers, specific examples being proteins such as glue, gelatin, casein, or albumin; natural gums such as gum arabic, or tragacanth gum; glucosides such as saponin, alginic acid and alginic acid derivatives such as alginic acid propylene glycol ester, triethanolamine alginate, or ammonium alginate; or cellulose derivatives such as methyl cellulose, carboxymethyl cellulose, hydroxyethyl cellulose, or ethylhydroxyethyl cellulose.

As preferred examples of polymeric dispersants there may be mentioned synthetic polymers: there may be mentioned polyvinyl alcohols; polyvinyl pyrrolidones; acrylic resins such as polyacrylic acids, acrylic acid-acrylonitrile copolymer, potassium acrylate-acrylonitrile copolymer, vinyl acetate-acrylic acid ester copolymer, acrylic acid-alkyl acrylate copolymer; styrene-acrylic acid resins such as styrene-acrylic acid copolymer, styrene-methacrylic acid copolymer, styrene-methacrylic acid-alkyl acrylate copolymer, styrene-methyl styrene-acrylic acid copolymer, styrene-methyl styrene-acrylic acid-alkyl acrylate copolymer; styrene-maleic acid; styrene-maleic anhydride; vinyl naphthalene-acrylic acid copolymer; vinyl naphthalene-maleic acid copolymer; and vinyl acetate copolymers such as vinyl acetate-ethylene copolymer, vinyl acetate-fatty acid vinyl ethylene copolymer, acetic acid vinylmaleic acid ester copolymer, acetic acid vinylcrotonic acid copolymer, acetic cid vinyl acrylic acid copolymer and their salts. of these, in particular copolymers of a monomer having a hydrophobic group and a monomer having a hydrophilic group and copolymers of monomers having both hydrophobic and hydrophilic groups are preferred. Example salts of the above include salts of diethylamine, ammonia, ethylamine, triethylamine, propylamine, isopropylamine, dipropylamine, butylamine, isobutylamine, triethanolamine, diethanolamine, aminomethyl propanol, and morpholine. These copolymers are preferably of weight average molecular weight 3,000 to 30,000 and even more preferably 5,000 to 15,000.

Also, as examples of surfactants that are preferred as dispersants there may be mentioned fatty acid salts, high alkyl dicarboxylic acid salts, high alcohol sulfuric acid ester salts, high alkyl sulfonic acid salts, condensates of high fatty acids and amino acids, sulfosuccinic acid ester salts, naphthenic acid salts, liquid fatty oil sulfuric acid ester salts, cationic surfactants such as alkyl allyl sulfonic acid salts, fatty acid amine salts, quaternary ammonium salts, sulfonium salts, anionic surfactants such as phosphonium, polyoxyethylene alkyl ethers, polyoxyethylene alkyl esters, sorbitan alkyl esters, and non-ionic surfactants such as polyoxyethylene sorbitan alkyl esters. It will be understood by a person skilled in the art that function as a surfactant can also be achieved by adding surfactant to the ink composition.

The added amount of these dispersants is preferably in the range 1 to 60 weight %, and even more preferably in the range 5 to 30 weight %.

Water, Water-Soluble Organic Solvents, and Other Constituents

In an ink composition according to the present invention, water and water-soluble organic solvent are employed as main constituents.

The water-soluble organic solvent is preferably a low boiling-point organic solvent, preferred examples being methanol, ethanol, n-propyl alcohol, isopropyl alcohol, n-butanol, sec-butanol, tert-butanol, isobutanol, n-pentanol etc. Monohydric alcohols are particularly preferred. Preferably the added amount of low boiling point organic solvent is in the range of about 0.5 to 10 weight % with respect to the ink composition, and even more preferably a range of about 1.5 to 6 weight %.

Also, according to a preferred embodiment of the present invention, the ink composition desirably further contains a wetting agent selected from high boiling point organic solvents. Examples of preferred higher boiling point organic solvents include: polyhydric alcohols such as ethylene glycol, diethylene glycol, triethylene glycol, polyethylene glycol, polypropylene glycol, propylene glycol, butylene glycol, 1, 2, 6-hexanetriol, thioglycol, hexylene glycol, glycerin, trimethylol ethane, and trimethylol propane; alkyl ethers of polyhydric alcohols such as ethylene glycol monoethyl ether, ethylene glycol monobutyl ether, diethylene glycol monomethyl ether, triethylene glycol monoethyl ether, diethylene glycol monobutyl ether, triethylene glycol monomethyl ether, triethylene glycol monoethyl ether, etc; and N-methyl-2-pyrrolidone, 1,3-dimethyl-2-imidazolidinone, and triethanolamine etc.

Of these, water-soluble organic solvents of boiling point greater than 180° C. are preferably employed. The use of water-soluble organic solvents of boiling point greater than 180° C. induces water retention and the wettability of the ink composition. As a result, excellent storage stability can be achieved with no rise of viscosity and/or coagulation of the coloring agent even if the ink composition is stored for a long time. Furthermore, an ink composition can be achieved wherein fluidity and re-dispersibility can be maintained for a long time even if it is left in an open condition (condition in which it is in contact with air at room temperature). Furthermore, in an inkjet recording method, high discharge stability can be obtained without occurrence of clogging of the nozzle during printing or on restart after interruption of printing.

As examples of water-soluble organic solvents of boiling point over 180° C., there may be mentioned: ethylene glycol (boiling point: 197° C.; hereinbelow the boiling points are indicated in brackets), propylene glycol (187° C.), diethylene glycol (245° C.), pentamethylene glycol (242° C.), trimethylene glycol (214° C.), 2-butylene-1,4-diol (235° C.), 2-ethyl-1,3-hexane diol (243° C.), 2-methyl-2,4-pentanediol (197° C.), and N-methyl-2-pyrrolidone (202° C.), 1,3 dimethyl-2-imidazolidinone (257–260° C.), 2-pyrrolidone (245° C.), glycerin (290° C.), tripropylene glycol monomethyl ether (243° C.), dipropylene glycol monoethyl glycol (198° C.), dipropylene glycol monomethyl ether (190° C.), dipropylene glycol (232° C.), triethylene glycol monomethyl ether (249° C.), tetraethylene glycol (327° C.), triethylene glycol (288° C.), triethylene glycol monobutyl ether (278° C.), diethylene glycol monobutyl ether (230° C.), diethylene glycol monoethyl ether (202° C.), and diethylene glycol monomethyl ether (194° C.). Preferably the boiling point is at least 200° C. These water-soluble organic solvents may be used alone or as a mixture of two or more.

If triethylene glycol monobutyl ether (278° C.) or diethylene glycol monobutyl ether (230° C.) is to be used as the water-soluble organic solvent, these compounds are at the same time the butyl ether-based solvents mentioned above, and therefore, function as both a water-soluble organic solvent and a butyl ether-based solvent.

The content of these high boiling point organic solvents is preferably about 0.5 to 40 weight % with respect to the ink composition, and even more preferably 2 to 20 weight %.

The ink composition may contain tertiary amines, alkali hydroxides, alginic acid derivatives, sugars and sugar derivatives. Addition of tertiary amines confers wettability. Also, addition of tertiary amines and alkali hydroxides confers dispersion stability of the coloring agents in the ink composition and of the resin emulsion particles in the ink. Furthermore, addition of sugars or sugar derivatives confers wettability on the ink composition.

Examples of tertiary amines that may be given include trimethylamine, triethylamine, triethanolamine, dimethylethanolamine, diethylethanolamine, triisopropenolamine, and butyldiethanolamine. These may be used alone or as a mixture of two or more. The added amount of the tertiary amines to the ink composition is preferably about 0.1 to 10 weight %, and even more preferably 0.5 to 5 weight %.

Examples of alkali hydroxides are potassium hydroxide, sodium hydroxide and lithium hydroxide; their added amount is preferably about 0.01 to 5 weight %, and even more preferably about 0.05 to 3 weight %.

Preferred examples of alginic acid derivatives that may be mentioned include alkali metal salts of alginic acid (for example, the sodium salt or potassium salt), and organic salts of alginic acid (for example the triethanolamine salt), or ammonium alginate etc. The added amount of these alginic acid derivatives with respect to the ink composition is preferably about 0.01 to 1 weight %, and even more preferably about 0.05 to 0.5 weight %.

The reason why excellent images are obtained by addition of alginic acid derivatives is not clear, but it is thought that this occurs because multicharged metal salts present in the reaction liquid react with the alginic acid derivatives in the ink composition, changing the dispersion condition of the coloring agent, and promoting fixing of the coloring agent onto the recording medium.

Examples of sugars include monosaccharides, disaccharides, oligosaccharides (including trisaccharides and tetrasaccharides) and polysaccharides; preferred examples that may be given are glucose, mannose, fructose, ribose, xylose, arabinose, galactose, aldonic acid, glucitol (sorbitol), maltose, cellobiose, lactose, sucrose, trehalose, and maltotriose etc. Of these, polysaccharides covers sugars in the wide sense, and will be used in a meaning including substances which are widely present in the natural world such as alginic acid, -cyclodextrin, and cellulose. Also, as derivatives of these sugars, reduced sugars of the sugars referred to above, [(such as for example sugar alcohols (represented by the general formula $HOCH_2(CHOH)_nCH_2OH$ (where n represents an integer n=2 to 5)], oxidized sugars (such as for example aldonic acid or uronic acid etc.), amino acids, or thiosugars etc. may be mentioned. Sugar alcohols are particularly preferred, specific examples being maltitol or sorbitol etc. The added amount of sugar or sugar derivative with respect to the ink composition is preferably about 2.5 to 40 weight %, and even more preferably about 2.5 to 20 weight %.

The weight ratio of sugar or sugar derivative and resin emulsion in the ink composition according to the present invention is preferably above about 1:2, and even more preferably above about 1:1.

The ink composition may further contain surfactants. Specific examples that may be given of surfactants are: anionic surfactants (for example sodium dodecyl benzene sulfonate, sodium laurate, or ammonium polyoxyethylene alkyl ether sulfates etc), non-ionic surfactants (for example polyoxyethylene alkyl ethers, polyoxyethylene alkyl esters, polyoxyethylene sorbitan fatty acid esters, polyoxyethylene alkyl phenyl ethers, polyoxyethylene alkylamines, polyoxyethylene alkylamide etc) and acetylene glycol etc. These may be used alone or in a combination of two or more.

To the ink composition there may be further added nozzle clogging prevention agents, antiseptics, anti-oxidation agents, electrical conductivity regulators, pH regulators, viscosity regulators, surface tension regulators, or oxygen absorbents etc.

As examples of antiseptics/mildew-proofing agents, there may be mentioned sodium benzoate, sodium pentachlorophenol, sodium 2-pyridinethiol-1-oxide, sodium sorbate, sodium dehydroacetate, 1, 2-dibenzothiazolin-3-one (ICI's Proxel CRL, Proxel BDN, Proxel GXL, Proxel XL-2, Proxel TN).

Furthermore, as examples of pH regulators, solution adjuvants, or oxidation prevention agents, there may be mentioned: amines and modified forms thereof such as diethanolamine, triethanolamine, propanolamine, or morpholine, inorganic salts such as potassium hydroxide, sodium hydroxide, or lithium hydroxide, ammonium hydroxide, quaternary ammonium hydroxides (tetramethyl ammonium etc), potassium carbonate, sodium carbonate, lithium carbonate or the like carbonates or phosphates etc, or N-methyl-2-pyrrolidone, ureas such as urea, thiourea, tetramethyl urea, allophanates such as allophanate or methyl allophanate, biurets such as biuret, dimethyl biuret, or tetramethyl biuret, L-ascorbic acid and salts thereof.

Also, the ink composition according to the present invention may contain oxidation prevention agents and UV absorption agents, examples being Ciba-Geigy's Tinuvin 328, 900, 1130, 384, 292, 123, 144, 622, 770, 292, Irgacor 252, 153, Irganox 1010, 1076, 1035 MD 1024 and oxides of lanthanides.

The ink composition of the present invention preferably includes glycerin as a wetting agent. Addition of glycerin effectively prevents drying of the ink composition at the nozzle front face of the recording head, and prevents clogging of the nozzle. The added amount of glycerin is preferably 5 to 30 weight parts in 100 weight parts of the ink composition. Apart from the above, diethylene glycol and/or ethylene glycol etc may be employed as wetting agents.

Also, inorganic oxide colloids (also called sols of inorganic oxides) may be included. Commercially available products may be employed for these inorganic oxide colloids.

Manufacture of Ink Composition

An ink composition according to the present invention may be manufactured by dispersing and mixing the foregoing constituents by a suitable method. A uniform liquid dispersion is prepared by mixing the coloring agent, dispersion agent, aqueous solvent and other constituents in a suitable dispersing device (for example, a ball mill, sand mill, attritor, roll mill, agitator mill, Henshall mixer, colloid mill, ultrasonic homogenizer, jet mill, or Ong mill etc). Next, the ink solution is prepared by adding the water, water-soluble organic solvent, sugar, pH regulator, antiseptic, mildew-proofing agent etc and thoroughly dissolving. The target ink composition is obtained by sufficiently stirring, followed by filtering in order to remove coarse particles and foreign matter which could cause clogging.

Nozzle Plate

In a preferred embodiment of the present invention, the composition according to the present invention is preferably employed in an inkjet recording method using an inkjet recording head comprising a nozzle plate as described in Laid-open Japanese Patent Publication No. H. 7-125220. By the combination of the nozzle plate described in Laid-open Japanese Patent Publication No. H. 7-125220 and the ink composition described above, discharge stability can be further improved and bending of the flight path can be suppressed to a great extent; furthermore, it is possible to cope with high response frequencies.

Figure 2:
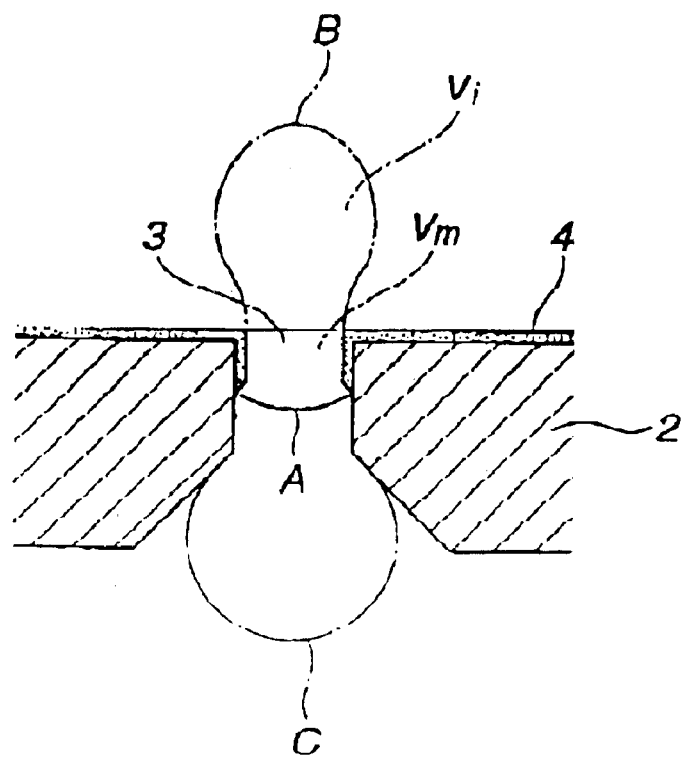
FIG. 2 is a view to a larger scale of the nozzle plate of FIG. 1.

The basic construction of the nozzle plate described in Laid-open Japanese Patent Publication H. 7-125220 is as shown in FIG. 1. In this nozzle plate 1, a nozzle 3 is arranged on a base member 2, and, in addition, an ink repellent coating layer 4 is provided such as to enter the inside surface of this base member 1 and nozzle 3. This ink repellent coating layer 4 is constituted so as to enter as far as a position 5 on the inside surface of nozzle 3. FIG. 2 is a view to a larger scale of the vicinity of nozzle 3. When an inkjet recording head comprising a nozzle plate of this construction is filled with ink composition, the vibrating surface of the meniscus of the ink composition is formed in a form that connects to the lower edge 5 of the ink repellent coating layer within nozzle 3 of ink repellent coating layer 4. The central position A of this vibration is as shown in FIG. 2. Furthermore, when ink composition is discharged, ink drops are discharged in a form as shown by B in FIG. 2, and separate from the nozzle. After ink discharge, the ink composition is temporarily withdrawn to the position indicated by C in FIG. 2, and the meniscus vibration position is also immediately returned to meniscus vibration position A. With the plate as described in this publication, the bottom edge 5 of the ink repellent coating layer is fixed such that the ratio of Vm, which is the gap volume within the nozzle from the surface of nozzle plate 1 as far as the center of vibration A of the meniscus to the amount Vi of the volume from the surface 2 of nozzle 4 as far as the front face B of the ink prior to discharge i.e. the amount of an ink drop is in the range of 0.05 to 0.50. In a preferred embodiment, preferably this ink repellent coating layer is formed by a technique wherein a co-deposited plating layer is formed on the surface of nozzle plate 1 by immersion in an electrolyte in which nickel ions and particles of water-repellent polymeric resin such as polytetrafluoroethylene are dispersed by means of charge, whilst stirring the liquid. As examples of fluorine-based polymeric materials that may be employed for the co-deposition plating treatment, there may be mentioned resins such as polytetrafluoroethylene, polyperfluoroalkoxybutadiene, polyfluorovinylidene, polyfluorovinyl, and polydiperfluoroalkylfumarate etc; these may be used alone or in the form of mixtures.

Inkjet Recording Method

A recording method according to the present invention includes a step of recording an image by depositing the ink composition on a recording medium. In the present invention, for the ink composition an ink composition as described above may be employed.

As the recording medium in the present invention, a recording medium that has absorption for the ink composition, such as paper, or a recording medium that is substantially non-absorbent with respect to the ink composition may suitably be employed. As specific examples of recording media to which the inkjet recording method of the present invention may be applied, there may be mentioned plastic sheets whose base material is for example polyethylene terephthalate, polycarbonate, polypropylene, polyethylene, polysulfone, ABS resin, or polyvinyl chloride, recording media in which a metal coating treatment is performed by a technique such as evaporation onto non-metallic base material or a metallic surface of for example brass, iron, aluminum, SUS or copper etc, recording media whose base material is paper subjected to water repellent treatment etc, recording media subjected to water repellent treatment etc on a fiber surface of for example cloth, and recording media consisting of so-called ceramics material, which is inorganic material baked at high temperature.

Figure 3:
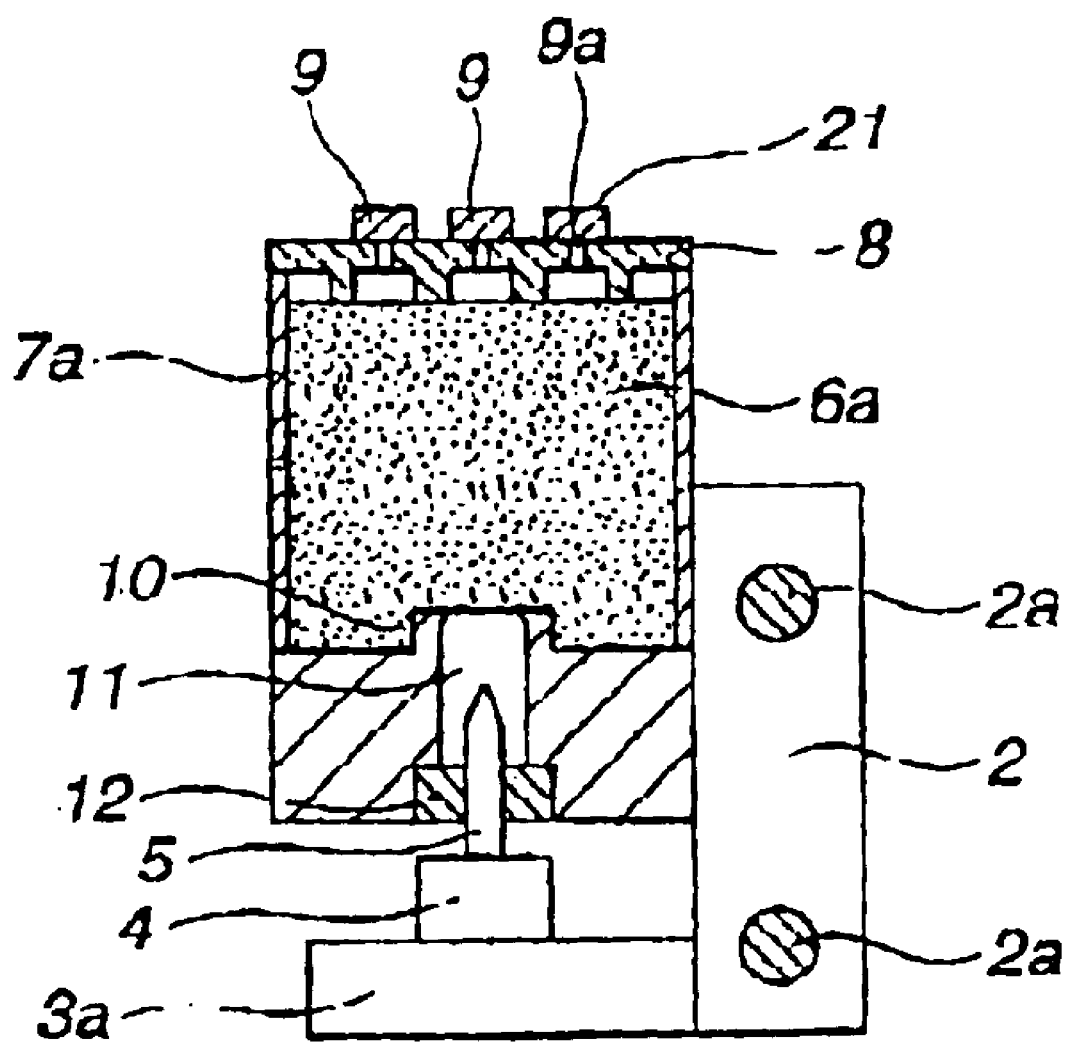
FIG. 3 is a cross sectional view showing the relationship between the tank and recording head.

Next, a recording method will be described in which a recording is formed by filling a tank in the interior of which is accommodated foam consisting of a porous member with the ink composition, and discharging this to a recording head from this tank. FIG. 3 is a cross sectional view showing the relationship between the tank and the recording head. Tank 7a is provided above a recording head 3a which is arranged by means of a guide shaft 2a on a carriage 2. Foam 6a consisting of a porous member such as polyurethane foam is accommodated in the interior of tank 7a. Tank 7a is provided in its lid 8 with connecting holes 9 that connect with the outside, and is formed at its bottom face with a frustum-shaped projection 10 which is in close contact with foam 6a. A blind plug 12 and ink composition chamber 11 are provided from the middle part of this projection 10 in the downward direction. The ink composition with which tank 7a is impregnated is supplied to recording head 3a by means of a hollow needle 5 which is inserted into blind plug 12 and connected with ink composition chamber 11, since recording head 3a is linked with ink composition chamber 11 through a filter chamber 4. At least one of connecting holes 9 is sealed under reduced pressure until immediately prior to use, by means of a non-permeable sealing member 21 which is capable of being unsealed. Thus, by unsealing immediately prior to use, tank 7a communicates with the outside through communicating hole 9a.

The method of recording using an ink pack is the same apart from the use of an ink cartridge equipped with a tank holding foam as described above.

If an ink cartridge equipped with a tank holding foam is employed, the surfactant is adsorbed onto the foam, so more surfactant can be contained than in the case of use of an ink pack; this method is therefore preferable.

Practical Examples

The present invention is further described in detail with reference to the following practical examples; however, the present invention is not restricted to these practical examples.

Also, the unit "duty" which is used in the present specification is defined by the formula below, which shows the units of the value D which is calculated.

D=number of printed dots/(vertical resolution×horizontal resolution)×100 (duty)

Preparation of Ink Composition

Ink compositions having the following compositions were manufactured by the following operations. First of all, the pigment and dispersant resin were mixed, then dispersed for two hours together with glass beads (diameter 1.7 mm, amount (weight) 1.5 times the amount of the mixture, using a sand mill (manufactured by Yasukawa Seisakusho). The glass beads were then removed, and the other additives added, and stirring performed for 20 minutes at normal temperature. Filtering was carried out using a 5 µm membrane filter, to obtain the ink composition.

Example 1

| | |
|---|---|
| C.I. Pigment Yellow 128 | 3.5 weight % |
| Styrene-acrylic acid copolymer (dispersant) | 1.3 weight % (solid fraction) |
| Glycerin | 15 weight % |
| Triethanolamine | 0.5 weight % |
| Ethylene glycol | 4 weight % |
| Surfynol 104 (Chemical compound (I)) | 1 weight % |
| Triethylene glycol monobutyl ether | 4 weight % |
| 2-pyrrolidone | 4 weight % |
| Pure water | balance |

Example 2

| | |
|---|---|
| C.I. Pigment Yellow 110 | 2.5 weight % |
| Styrene-acrylic acid copolymer (dispersant) | 1.4 weight % (solid fraction) |
| Glycerin | 12 weight % |
| Diethylene glycol | 5 weight % |
| Triethanolamine | 0.9 weight % |
| Olefine STG (Chemical compound (I)) | 0.8 weight % |
| Triethylene glycol monobutyl ether | 5 weight % |
| 2-pyrrolidone | 4 weight % |
| Pure water | balance |

Example 3

| | |
|---|---|
| C.I. Pigment Blue 15:3 | 2.5 weight % |
| Styrene-acrylic acid copolymer (dispersant) | 1.5 weight % (solid fraction) |
| Glycerin | 10 weight % |
| Ethylene glycol | 5 weight % |
| Triethanolamine | 0.8 weight % |
| Olefine STG (Chemical compound (I)) | 1 weight % |
| Triethylene glycol monobutyl ether | 5 weight % |
| 2-pyrrolidone | 6 weight % |
| Pure water | balance |

Example 4

| | |
|---|---|
| C.I. Pigment Red 122 | 3.5 weight % |
| Styrene-acrylic acid copolymer (dispersant) | 1.5 weight % (solid fraction) |
| Glycerin | 15 weight % |
| Triethanolamine | 0.7 weight % |
| Olefine STG (Chemical compound (I)) | 1.2 weight % |
| Triethylene glycol monobutyl ether | 6 weight % |
| 2-pyrrolidone | 6 weight % |

Example 5

| | |
|---|---|
| C.I. Pigment Red 122 | 3.4 weight % |
| Styrene-acrylic acid copolymer (dispersant) | 1.5 weight % (solid fraction) |
| Glycerin | 15 weight % |
| Ethylene glycol | 3 weight % |
| Triethanolamine | 0.7 weight % |
| Surfynol 104 (Chemical compound (I)) | 1.5 weight % |
| Triethylene glycol monobutyl ether | 7 weight % |
| 2-pyrrolidone | 8 weight % |
| Pure water | balance |

Example 6

| | |
|---|---|
| C.I. Pigment Yellow 74 | 4.1 weight % |
| Styrene-acrylic acid copolymer (dispersant) | 1.8 weight % (solid fraction) |
| Glycerin | 12 weight % |
| Diethylene glycol | 2 weight % |
| Triethanolamine | 0.7 weight % |
| Olefine STG (Chemical compound (I)) | 1 weight % |

Example 7

| | |
|---|---|
| Carbon black | 2.1 weight % |
| Styrene-acrylic acid copolymer (dispersant) | 0.5 weight % (solid fraction) |
| Glycerin | 15 weight % |
| Triethanolamine | 0.7 weight % |
| Ethylene glycol | 5 weight % |
| Olefine STG (Chemical compound (I)) | 1 weight % |
| Triethylene glycol monobutyl ether | 5 weight % |
| 2-pyrrolidone | 4 weight % |
| Pure water | balance |

Comparative Example 1

| | |
|---|---|
| C.I. Pigment Yellow 128 | 3.5 weight % |
| Styrene-acrylic acid copolymer (dispersant) | 1.3 weight % (solid fraction) |
| Glycerin | 16 weight % |
| Triethanolamine | 0.5 weight % |
| Ethylene glycol | 4 weight % |
| Surfynol 104 (Chemical compound (I)) | 1 weight % |
| Triethylene glycol monobutyl ether | 4 weight % |
| 2-pyrrolidone | 2 weight % |
| Pure water | balance |

Comparative Example 2

| | |
|---|---|
| C.I. Pigment Blue 15:3 | 2.5 weight % |
| Styrene-acrylic acid copolymer (dispersant) | 1.5 weight % (solid fraction) |
| Glycerin | 12 weight % |
| Ethylene glycol | 5 weight % |
| Triethanolamine | 0.8 weight % |
| Olefine STG (Chemical compound (I)) | 1 weight % |
| Triethylene glycol monobutyl ether | 5 weight % |
| 2-pyrrolidone | 1 weight % |
| Pure water | balance |

Comparative Example 3

| | |
|---|---|
| C.I. Pigment Red 122 | 3.4 weight % |
| Styrene-acrylic acid copolymer (dispersant) | 1.5 weight % (solid fraction) |
| Glycerin | 18 weight % |
| Triethanolamine | 0.7 weight % |
| Olefine STG (Chemical compound (I)) | 1.5 weight % |
| Triethylene glycol monobutyl ether | 7 weight % |
| Pure water | balance |

Example 8

| | |
|---|---|
| Carbon black | 5 weight % |
| Styrene-acrylic acid copolymer (dispersant) | 2 weight % (solid fraction) |
| Glycerin | 15 weight % |
| Diethylene glycol | 10 weight % |
| Triethylene glycol monobutyl ether | 10 weight % |
| 2-pyrrolidone | 10 weight % |
| Surfynol 104 (Chemical compound (I)) | 1.5 weight % |
| Surfynol 465 (Chemical compound (II)) | 2 weight % |
| Water | balance |

Example 9

| | |
|---|---|
| C.I. Pigment Yellow 24 | 5 weight % |
| Styrene-acrylic acid copolymer (dispersant) | 1 weight % |
| Glycerin | 15 weight % |
| Diethylene glycol | 10 weight % |
| Triethylene glycol monobutyl ether | 10 weight % |
| 2-pyrrolidone | 10 weight % |
| Surfynol 104 (Chemical compound (I)) | 2 weight % |
| Surfynol 465 (Chemical compound (II)) | 2 weight % |
| Pure water | balance |

Example 10

| | |
|---|---|
| C.I. Direct Black 19 | 5 weight % |
| Glycerin | 15 weight % |
| Ethylene glycol | 10 weight % |
| Diethylene glycol monobutyl ether | 5 weight % |
| 2-pyrrolidone | 5 weight % |
| Surfynol 104 (Chemical compound (I)) | 1 weight % |
| Surfynol 465 (Chemical compound (II)) | 1 weight % |
| Pure water | balance |

Example 11

| | |
|---|---|
| C.I. Direct Yellow 86 | 4 weight % |
| Glycerin | 15 weight % |
| Ethylene glycol | 10 weight % |
| Diethylene glycol monobutyl ether | 10 weight % |
| 2-pyrrolidone | 10 weight % |
| Surfynol 104 (Chemical compound (I)) | 3 weight % |
| Surfynol 465 (Chemical compound (II)) | 2 weight % |
| Pure water | balance |

Example 12

| | |
|---|---|
| C.I. Pigment Yellow 128 | 4 weight % |
| Styrene-acrylic acid copolymer (dispersant) | 1.5 weight % |
| Glycerin | 10 weight % |
| Triethylene glycol monobutyl ether | 5 weight % |
| 2-pyrrolidone | 4 weight % |
| Triethanolamine | 0.5 weight % |
| EDTA | 0.05 weight % |
| Surfynol 104 (Chemical compound (I)) | 1.5 weight % |
| Surfynol 465 (Chemical compound (II)) | 1.8 weight % |
| Pure water | balance |

Comparative Example 4

| | |
|---|---|
| Carbon Black | 5 weight % |
| Styrene-acrylic acid copolymer (dispersant) | 2 weight % |
| Glycerin | 15 weight % |
| Triethylene glycol monobutyl ether | 10 weight % |
| Surfynol 104 (Chemical compound (I)) | 1 weight % |
| Pure water | balance |

Comparative Example 5

| | |
|---|---|
| C.I. Pigment Yellow 74 | 5 weight % |
| Styrene-acrylic acid copolymer (dispersant) | 1 weight % |
| Glycerin | 15 weight % |
| 2-pyrrolidone | 10 weight % |
| Surfynol 104 (Chemical compound (I)) | 1 weight % |
| Pure water | balance |

Printing Evaluation Test

Using an inkjet printer MJ-930C (manufactured by Seiko Epson Corporation), inkjet compositions prepared as above were used to fill an ink pack in the case of Examples 1 to 6 and Comparative Examples 1 to 3, and used to fill an ink cartridge in the case of Examples 7 to 12 and Comparative Examples 4 to 5, and printing was performed using respective special-purpose inkjet recording media (manufactured by Seiko Epson Corporation, special-purpose glossy film). The weight of ink discharged per dot was 0.040 μg, and the output resolution 360 dpi×360 dpi.

Evaluation 1

Evaluation of Printing Stability

Using the above mentioned printer MJ-930C, printing was performed continuously over a long period at normal temperature, using the ink compositions of Examples 1 to 12 and Comparative Examples 1 to 5, and evaluation conducted in accordance with the following criteria, by measuring whether missing dots or ink scattering occurred. The results were as shown in Table 1 below.

Evaluation A: after the passage of 48 hours, there were less than 10 occurrences of missing dots or ink scattering.

Evaluation B: after the passage of 48 hours, there were 10 occurrences of missing dots or ink scattering.

Evaluation C: after the passage of 24 hours, there were 10 occurrences of missing dots or ink scattering.

Evaluation D: after the passage of 24 hours, there were many more than 10 occurrences of missing dots or ink scattering.

Evaluation 2

Clogging Reliability

A printer was filled with the ink compositions of Examples 1 to 12 and Comparative Examples 1 to 5, and printing of Arabic numerals was conducted continuously for 10 minutes. After this, the printer was stopped, and, without replacing the cap, was left to stand for 2 weeks in an environment of temperature 40° C., humidity 25%. After leaving to stand, printing of Arabic numerals was again performed, and the number of times of repeated operation required until the same print quality as before leaving to stand was obtained was examined. The evaluation was conducted in accordance with the following criteria. The results were as shown in Table 1 below.

Evaluation A: printing quality the same as initially was obtained after repeating operation 0 to 2 times.

Evaluation B: printing quality the same as initially was obtained after repeating operation 3 to 5 times.

Evaluation C: printing quality the same as initially was not obtained even after repeating operation 6 times or more.

Evaluation 3

Blurring

Special purpose ink cartridges were filled with the ink compositions obtained in Examples 8 to 12, Comparative Examples 4 to 5, and printing conducted on paper (Trade name "Xerox 4024", manufactured by Xerox) such that ink colors were adjacent in the following combinations, using an inkjet printer (trade name "MJ-930C", manufactured by Seiko Epson Corporation). As a result, blurring between colors was observed, and evaluated in accordance with the following evaluation criteria.

Combinations:

(1): Ink combination obtained in Practical Example 1 and ink combination obtained in Practical Example 2

(2): Ink combination obtained in Practical Example 3 and ink combination obtained in Practical Example 4

(3): Ink combination obtained in Comparative Example 1 and ink combination obtained in Comparative Example 2

(Evaluation Criteria)

A: no blurring between the two colors, clear outline.

B: blurring in the form of whiskers between the two colors, poor printing quality.

Evaluation 4

Lightfastness

The ink compositions obtained in Examples 8 to 12, Comparative Examples 4 to 5 were used to fill the special purpose ink cartridge thereof, and printing conducted using an inkjet printer (Trade name "MJ-930C", manufactured by Seiko Epson Corporation). The printing output was solid color (100% duty). The printing medium employed was special purpose glossy film (manufactured by Seiko Epson Corporation). The lightfastness of the printed articles obtained was evaluated under the following conditions.

First of all, irradiation of light was conducted using a Xenon Weatherometer Ci35A (manufactured by ATLAS Inc.), the printed article being exposed with black panel 63° C., relative humidity 50%, degree of 340 nm UV irradiation 0.35 W/m. The irradiation conditions were 360 kJ/m (irradiation with light for 284 hours under the above conditions) or 720 kJ/m (irradiation with light for 568 hours under the above conditions).

After irradiation, the reflection density of the respective color constituents of the printed articles was measured using a spectrophotometer GRETAG SPM (manufactured by GRETAG Inc.). The conditions used were: white reference taken as absolute white, field of view angle: 2°, with light source D50, light source without filter. The residual density factor was evaluated in accordance with the following criteria:

(Evaluation Criteria)

Evaluation A: more than 90%

Evaluation B: 80% or more but less than 90%

Evaluation C: less than 80%

Table 1 shows the results obtained with the test examples.

TABLE 1

| Example/Evaluation | 1 | 2 |
|---|---|---|
| Example 1 | A | A |
| Example 2 | A | A |
| Example 3 | A | A |
| Example 4 | A | A |
| Example 5 | A | A |
| Example 6 | A | A |
| Example 7 | A | A |
| Comparative Example 1 | B | B |
| Comparative Example 2 | B | B |
| Comparative Example 3 | C | B |

As can be seen from Table 1, Examples 1 to 7 showed excellent results in respect of both printing stability and clogging reliability, compared with Comparative Examples 1 to 3.

TABLE 2

| Ink composition | Printing stability | Clogging reliability | Combination | Evaluation | Blurring | Lightfastness 360 kJ/m² | 720 kJ/m² |
|---|---|---|---|---|---|---|---|
| Practical example 8 | A | A | (1) | A | | A | A |
| Practical example 9 | A | A | | | | A | C |
| Practical example 10 | A | A | (2) | A | | C | C |
| Practical example 11 | A | A | | | | B | C |
| Practical example 12 | A | A | — | — | | A | A |
| Comparative example 4 | B | B | (3) | B | | A | A |
| Comparative example 5 | C | B | | | | A | C |

As can be seen from Table 2, Examples 8 to 11 showed excellent results in regard to each of printing stability, clogging reliability and prevention of blurring, compared with Comparative Examples 4 to 5. Also, Example 12 in which C.I. Pigment Yellow 128 was employed was superior in terms of printing stability and clogging reliability compared with Comparative Examples 4 to 5 and was superior in lightfastness to Examples 8 to 11 and Comparative Examples 4 to 5.

What is claimed is:

1. An ink composition containing at least: a coloring agent, 2-pyrrolidone, a surfactant, a butyl ether-based solvent which is triethylene glycol monobutyl ether, water, and a water-soluble organic solvent wherein said surfactant is a chemical compound represented by the following chemical formula (I):

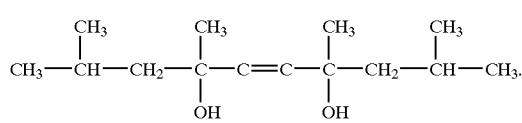

2. The ink composition according to claim 1 wherein the weight ratio of said surfactant, butyl ether-based solvent, and 2-pyrrolidone is 1:4:4 to 1:20:20.

3. A method comprising providing the ink composition according to claim 2 and discharging the ink composition from an inkjet recording head comprising a nozzle plate wherein some of an ink repellent coating layer that is coated onto an external surface of said nozzle plate is introduced on to an inner surface of said nozzle such that the volume of a gap within the nozzle from the outer surface of the nozzle plate as far as a meniscus-forming face is in a range of 0.05 to 0.50 with respect to a quantity of ink that is discharged.

4. The ink composition according to claim 2 wherein the added amount of said coloring agent is 1 to 5 weight % with respect to the ink composition.

5. The ink composition according to claim 2 further containing dispersant.

6. The ink composition according to claim 5 wherein said dispersant is styrene-(meth) acrylic acid based water-soluble resin.

7. The ink composition according to claim 2 in which said water-soluble organic solvent has a boiling point of at least 180° C.

8. The ink composition according to claim 2 further containing as said water-soluble organic solvent a tertiary amine.

9. The ink composition according to claim 2 further containing alkali hydroxide, alginic acid derivative, or a sugar or sugar derivative.

10. The ink composition according to claim 9 comprising said sugar derivative, wherein said sugar derivative is a reduced sugar, oxidized sugar, sugar dehydration derivative, amino sugar, or thio-sugar.

11. The method according to claim 3 wherein said ink repellent coating layer is formed by co-dependent plating.

12. An ink composition containing at least: a coloring agent, 2-pyrrolidone, a surfactant, a butyl ether-based solvent, water, and a water-soluble organic solvent wherein said surfactant is a chemical compound represented by the following chemical formula (I):

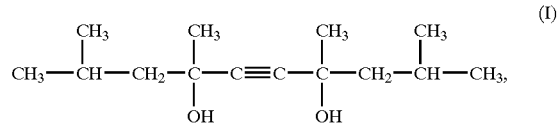

said ink composition further including a compound represented by the following chemical formula (II)

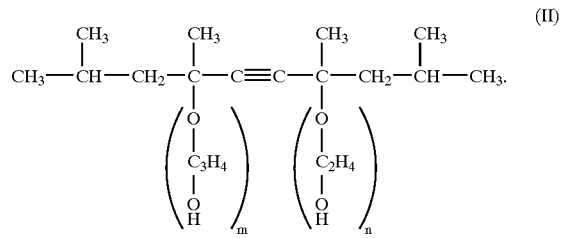

(m + n = 10)

13. The ink composition according to claim 12 wherein the content of the chemical compound represented by said chemical formula (I) is at least 1 weight % of the total amount.

14. The ink composition according to claim 12 wherein the content of the chemical compound represented by said chemical formula (I) is 1 to 3 weight %.

15. The ink composition according to claim 12 wherein the content of the chemical compound represented by said chemical formula (II) is at least 1 weight %.

16. The ink composition according to claim 12 wherein said butyl ether-based solvent is triethylene glycol monobutyl ether or diethylene glycol monobutyl ether.

17. The ink composition according to claim 12 wherein said coloring agent is C.I. Pigment Yellow 128.

18. The ink composition according to claim 12 wherein the content of said coloring agent is 15 weight % or less in the total amount of the ink composition, the content of said 2-pyrrolidone is at least 2 weight % in the total amount of the ink composition, and the content of said butyl ether-based solvent is at least 4 weight % in the total amount of the ink composition.

19. The ink composition according to claim 12 further containing a polymeric dispersant having a carboxyl group in the molecule.

20. The ink composition according to claim 12 further containing a moisture-retaining agent selected from the group consisting of glycorin, diethylene glycol and ethylene glycol.

21. A recording method wherein formation of a recording is performed by depositing the ink composition of claim 1 on a recording medium.

22. The recording method according to claim 21 being an inkjet recording method wherein printing is performed by discharging drops of the ink composition using said recording method and depositing these drops on the recording medium.

23. The recording method according to claim 22 employing an inkjet recording head comprising a nozzle plate that has been subjected to ink repellent treatment.

24. A recording method wherein formation of a recording is performed by filling a tank accommodating in its interior a form comprising a porous member with the ink composition according to claim 1 and discharging it from this tank to a recording head.

25. A recording wherein the ink composition according to claim 1 is deposited on a recording medium in a prescribed pattern.

26. The ink composition according to claim 2, wherein the coloring agent is a pigment and is present in an amount of about 1 to 5 wt %, the 2-pyrrolidone being present in an amount of about 1–10 wt %, the triethylene glycol monobutyl ether being present in an amount of about 1–10 wt %, and the compound of formula (I) being present in an amount of about 0.05 to 5 wt %.

* * * * *